United States Patent
Itzkowitz

(10) Patent No.: US 11,641,976 B2
(45) Date of Patent: May 9, 2023

(54) AIR FRYER PRESSURE COOKER

(71) Applicant: The Steelstone Group LLC, Brooklyn, NY (US)

(72) Inventor: Binyumen Itzkowitz, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 352 days.

(21) Appl. No.: 16/743,556

(22) Filed: Jan. 15, 2020

(65) Prior Publication Data

US 2020/0221900 A1 Jul. 16, 2020

Related U.S. Application Data

(60) Provisional application No. 62/792,563, filed on Jan. 15, 2019.

(51) Int. Cl.
| | |
|---|---|
| *A47J 37/06* | (2006.01) |
| *A47J 37/12* | (2006.01) |
| *A47J 36/06* | (2006.01) |
| *A47J 27/086* | (2006.01) |

(52) U.S. Cl.
CPC ......... *A47J 37/0641* (2013.01); *A47J 27/086* (2013.01); *A47J 36/06* (2013.01); *A47J 37/1209* (2013.01)

(58) Field of Classification Search
None
See application file for complete search history.

(56) References Cited

U.S. PATENT DOCUMENTS

2009/0120303 A1 * 5/2009 Popeil et al. ........... A47J 37/12
99/403

FOREIGN PATENT DOCUMENTS

| | | | | |
|---|---|---|---|---|
| CN | 204467868 U | * | 7/2015 | .......... A47J 37/0641 |
| CN | 204697804 U | * | 10/2015 | .......... A47J 37/0641 |
| CN | 204765197 U | * | 11/2015 | .......... A47J 37/0641 |
| CN | 105996809 A1 | * | 10/2016 | .......... A47J 37/0664 |
| CN | 106175477 A | * | 12/2016 | .......... A47J 27/0641 |
| CN | 108634807 A | * | 10/2018 | .............. A47J 27/08 |
| EP | 2848169 A1 | * | 3/2015 | .............. A47J 37/04 |
| WO | WO 2010034374 A1 | * | 4/2010 | .......... A47J 37/1209 |

OTHER PUBLICATIONS

Machine translation of CN 108634807 A performed on Mar. 23, 2022, Huang et al. (Year: 2018).*
Machine translation of CN 106175477 A performed on Mar. 23, 2022, Fu et al. (Year: 2016).*

(Continued)

*Primary Examiner* — Brian W Jennison
*Assistant Examiner* — Kevin Guanhua Wen
(74) *Attorney, Agent, or Firm* — Myers Wolin, LLC

(57) ABSTRACT

An embodiment of the present disclosure provides a cooker including: a housing; a pressure pot; an air fryer pot; a heater; and a fan. The pressure pot is configured to be disposed in the housing. The air fryer pot is configured to be disposed in the housing. The heater is disposed in the housing. The heater is configured to heat air outside the air fryer pot when the air fryer pot is in the housing. The fan blows the air heated by the heater into an inside space of the air fryer pot when the air fryer pot is disposed in the housing.

12 Claims, 3 Drawing Sheets

(56) References Cited

OTHER PUBLICATIONS

Machine translation of CN 204697804 U performed on Mar. 23, 2022, Zhou et al. (Year: 2015).*
Machine translation of CN 204467868 U performed on Jul. 25, 2022, Yang (Year: 2015).*
Machine translation of CN 105996809 A1 performed on Jul. 25, 2022, Luo (Year: 2016).*
Machine translation of CN 204765197 U performed on Jul. 25, 2022, Zhu et al. (Year: 2015).*
Machine translation of WO 2010034374 A1 performed on Nov. 28, 2022, De Longhi (Year: 2010).*

* cited by examiner

AIR FRYER PRESSURE COOKER

CROSS REFERENCES TO RELATED APPLICATIONS

This application claims the benefit of U.S. Provisional Patent Application No. 62/792,563 filed on Jan. 15, 2019. The disclosure and entire teachings of U.S. Provisional Patent Application 62/792,563 are hereby incorporated by reference.

FIELD

The present disclosure generally relates to an air fryer pressure cooker.

BACKGROUND

There are cookers that can perform multi cooking functions, such as boiling, simmering, baking, frying, roasting, stewing, and steaming. Existing cookers having both a pressure-cooking function and an air fryer function may require the users to remove and replace respective lids to utilize either the air frying function or the pressure-cooking function.

SUMMARY

An embodiment of the present disclosure provides a cooker including: a housing; a pressure pot; an air fryer pot; a heater; and a fan. The pressure pot is configured to be disposed in the housing. The air fryer pot is configured to be disposed in the housing. The heater is disposed in the housing. The heater is configured to heat air outside the air fryer pot when the air fryer pot is within the housing. The fan blows the air heated by the heater into an inside space of the air fryer pot when the air fryer pot is disposed in the housing.

In another embodiment of the present disclosure, the cooker further includes a lid configured to cover the pressure pot when the pressure pot is disposed in the housing and to cover the air fryer pot when the air fryer pot is disposed in the housing.

In another embodiment of the present disclosure, the air fryer pot is provided with one or more air vents. The air heated by the heater flows into the inside space of the air fryer pot through the air vents of the air fryer pot when the air fryer pot is disposed in the housing.

In another embodiment of the present disclosure, the heater and the fan are disposed between a bottom of the air fryer pot and a bottom of the housing when the air fryer pot is disposed in the housing.

DETAILED DESCRIPTION OF THE PREFERRED EMBODIMENTS

Figure 1A:
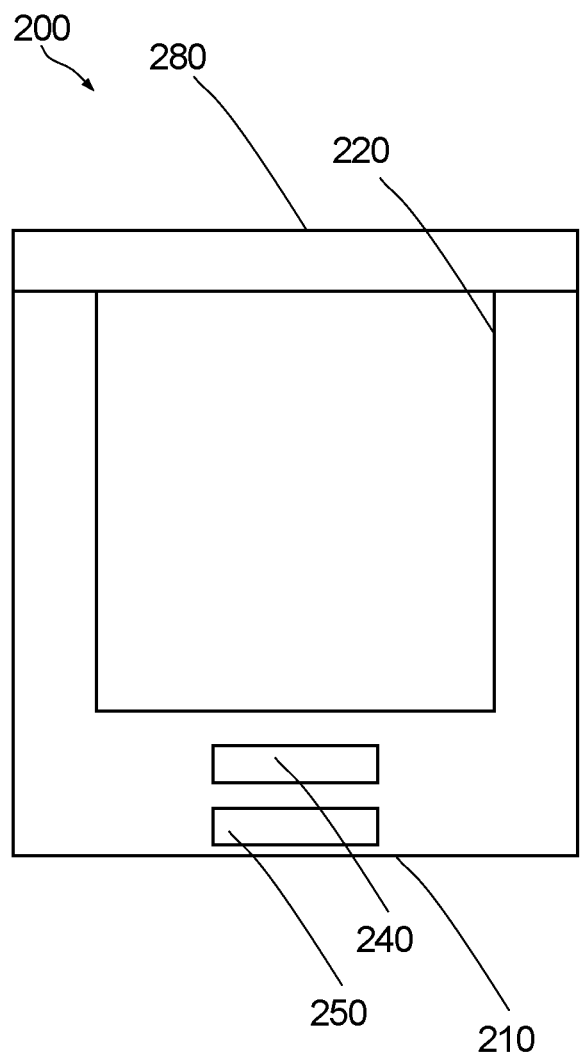
FIGS. 1A and 1B illustrate schematic diagrams of a cooker according to one embodiment.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 1B:
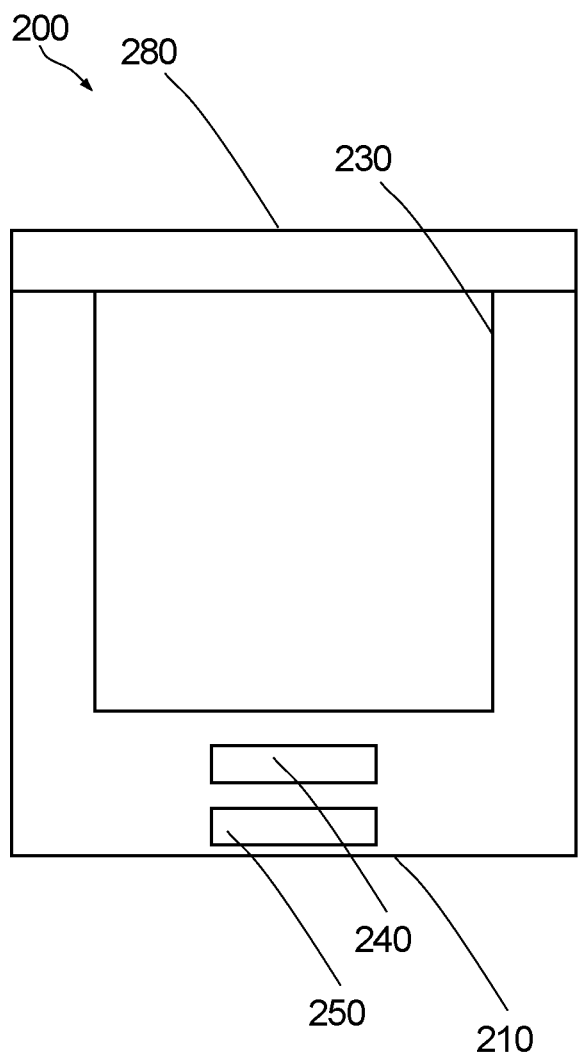

FIGS. 1A and 1B illustrate schematic diagrams of a cooker according to one embodiment.

The cooker 200 in FIGS. 1A and 1B may include a housing 210, a pressure pot 220, an air fryer pot 230, a heater 240, and a fan 250. The pressure pot 220 may be configured to be disposed in the housing 210. The air fryer pot 230 may be configured to be disposed in the housing 210. In one example, the pressure pot 220 and the air fryer pot 230 may be interchangeably disposed in the housing 210. It is noted that in some embodiments, the housing 210 may be sealable and pressurized, such that the pressure pot 220 within the housing 210 may be pressurized. In other embodiments, the pressure pot 220 itself is pressurized and the housing remains exposed to outside pressure.

In one example, the heater 240 may be disposed in the housing 210. The heater 240 may be configured to heat the pressure pot 220 when the pressure pot 220 is disposed in the housing 210. Further, the heater 240 may be configured to heat air outside the air fryer pot 230 when the air fryer pot 230 is disposed in the housing 210. The fan 250 may blow the air heated by the heater 240 into an inside space of the air fryer pot 230 when the air fryer pot 230 is disposed in the housing 210. In a non-limiting example, the heater 240 and the fan 250 may be disposed between a bottom of the air fryer pot 230 and a bottom of the housing 210 when the air fryer pot 230 is disposed in the housing 210.

Figure 2:
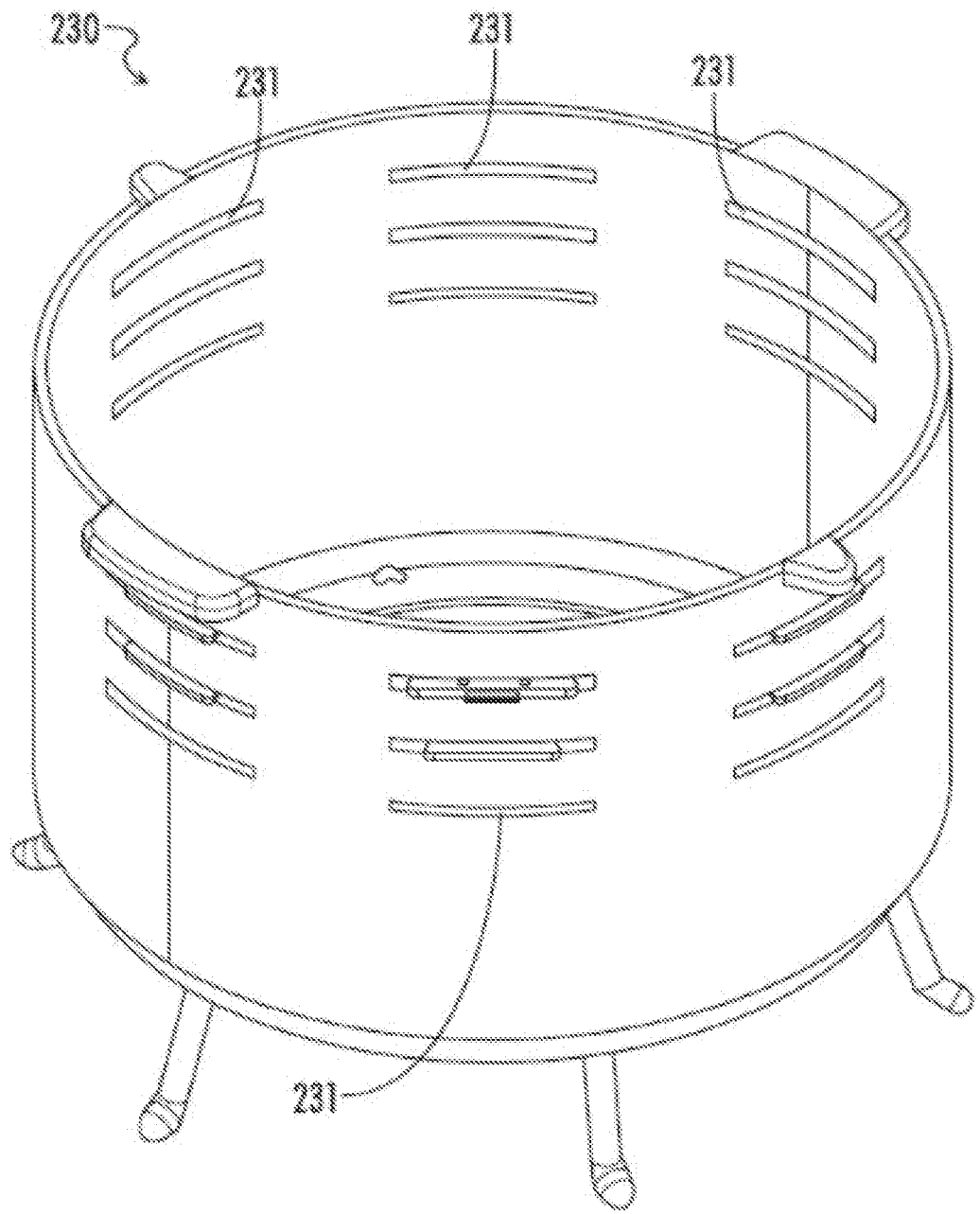
FIG. 2 illustrates a perspective view of an air fryer pot according to one embodiment.
Figure 3:
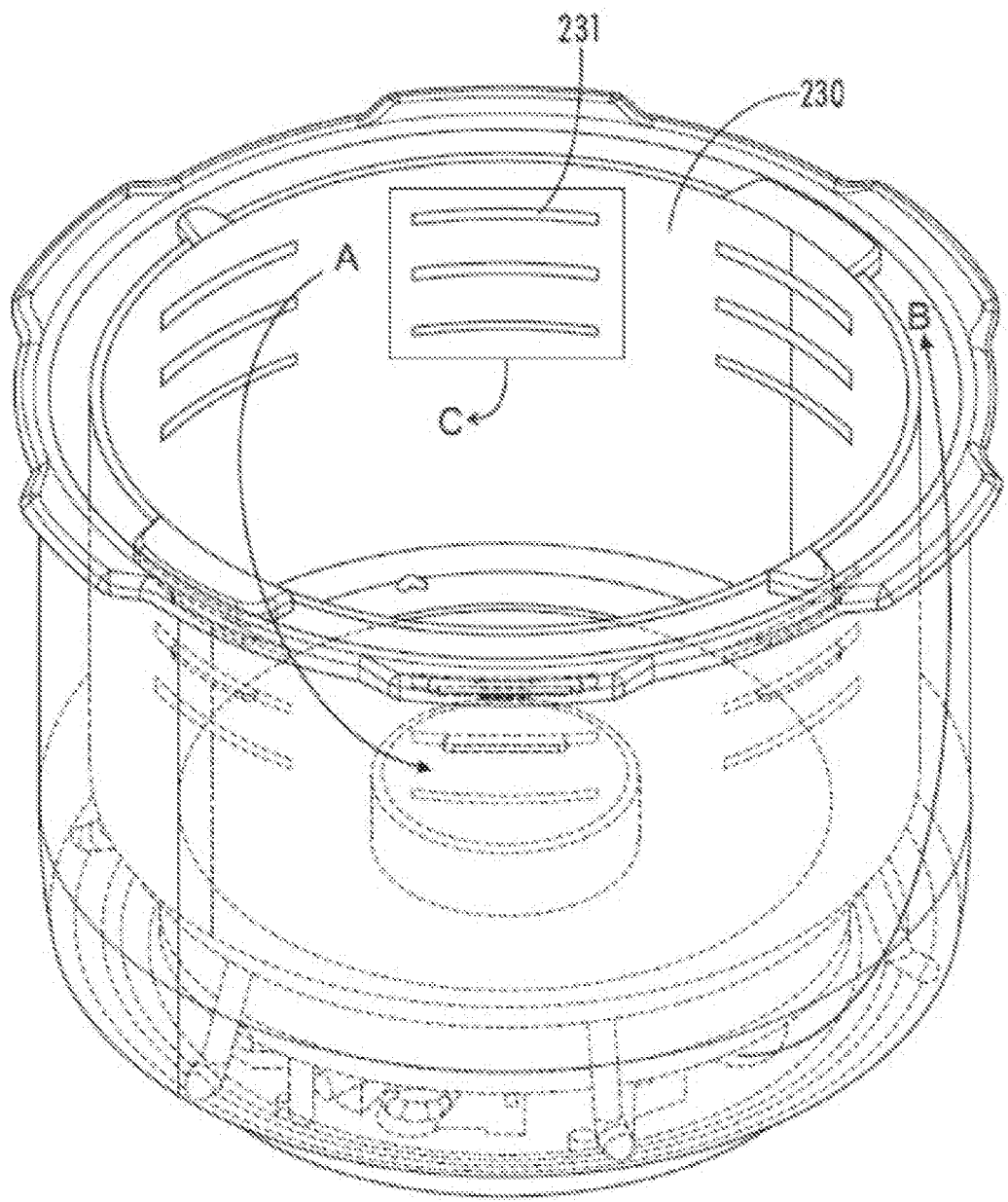
FIG. 3 illustrates a perspective view of parts of a cooker according to one embodiment.

In the illustrated example shown in FIGS. 2-3, the air fryer pot 230 may be provided with one or more air vents 231. The air heated by the heater 240 may flow into the inside space of the air fryer pot 230 through the air vents 231 of the air fryer pot 230 when the air fryer pot 230 is disposed in the housing 210.

According to the cooker 200 in the present embodiment, a user can utilize a pressure cooker function along with an air frying function. To utilize the air frying function of the cooker 200, the user may need only use the corresponding air fryer pot 230 that is disposed in the cooker 200. In operation of the cooker 200, the cooker 200 may allow air to be sucked in through a hole in the housing 210, and blown out through a gap (point B on FIG. 3) between the air fryer pot 230 and an intermediary holding pot. From the gap the hot air may enter the inside space (e.g., the cooking chamber) through the vents 231 (point C on FIG. 3).

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A cooker system comprising:
   a housing;
   a pressure pot; and an air fryer pot that are configured to be interchangeably disposed in the housing;
   a heater disposed in the housing, the heater being configured to heat air outside the air fryer pot when the air fryer pot is disposed in the housing;
   a fan that blows the air heated by the heater into an inside space of the air fryer pot when the air fryer pot is disposed in the housing; and
   a lid configured to cover the pressure pot when the pressure pot is disposed in the housing and to cover the air fryer pot when the air fryer pot is disposed in the housing,
   wherein the air fryer pot and the pressure pot are each configured to be in contact with a same location, in three dimensions, of the lid when the corresponding pot is disposed in the housing.

2. The cooker system of claim 1, wherein the air fryer pot is provided with one or more air vents, the air heated by the heater flowing into the inside space of the air fryer pot through the air vents of the air fryer pot when the air fryer pot is disposed in the housing.

3. The cooker system of claim 1, wherein the heater and the fan are disposed between a bottom of the air fryer pot and a bottom of the housing when the air fryer pot is disposed in the housing, and are disposed between a bottom of the pressure pot and the bottom of the housing when the pressure pot is disposed in the housing.

4. The cooker system of claim 3, wherein when the pressure pot is disposed in the housing, the heater that is disposed between the bottom of the pressure pot and the bottom of the housing includes a highest portion that is located closer to the bottom of the pressure pot than a highest portion of the fan is, and
   when the air fryer pot is disposed in the housing, the highest portion of the heater, where the heater is disposed between the bottom of the air fryer pot and the bottom of the housing, is located closer to the bottom of the air fryer pot than the highest portion of the fan is.

5. The cooker system of claim 4, wherein the one or more air vents includes a plurality of longitudinal air vents that are arranged in a circumferential direction of the air fryer pot, and that are located at a side wall of the air fryer pot, each of the plurality of longitudinal air vents extending along the circumferential direction.

6. The cooker system claim 5, wherein a distance between the bottom of the air fryer pot and a lowest portion of the heater below the bottom of the air fryer pot is smaller than a longitudinal dimension of each of the longitudinal air vents.

7. The cooker system of claim 5, further comprising a plurality of legs that each extend from the bottom side of the housing toward the bottom side of the air fryer pot and that each overlap with at least one of the fan and the heater in a side view.

8. The cooker system of claim 5, wherein two adjacent longitudinal air vents of the plurality of longitudinal air vents are spaced apart from each other by a distance that is smaller than a longitudinal dimension of each of the two adjacent longitudinal air vents.

9. The cooker system of claim 5, wherein the air fryer pot includes a projection projecting outwardly from a top edge of the air fryer pot, and
   wherein the projection includes at least one portion that extends along the circumferential direction and that is located at a same location as one of the plurality of longitudinal air vents.

10. The cooker system of claim 1, wherein a bottom of the air fryer pot and a bottom of the pressure pot are configured to be located at a substantially same location in a vertical direction.

11. The cooker system of claim 1, wherein the same heater is disposed in the housing when the air fryer pot is disposed in the housing and when the pressure pot is disposed in the housing.

12. A cooker system comprising:
   a housing;
   a pressure pot and an air fryer pot that are configured to be interchangeably disposed in the housing;
   a heater disposed in the housing, the heater being configured to heat air outside the air fryer pot when the air fryer pot is disposed in the housing;
   a fan that blows the air heated by the heater into an inside space of the air fryer pot when the air fryer pot is disposed in the housing; and a lid configured to cover the pressure pot when the pressure pot is disposed in the housing and to cover the air fryer pot when the air fryer pot is disposed in the housing, wherein the air fryer pot and the pressure pot are each configured to be in contact with the same lid when the corresponding pot is disposed in the housing.

\* \* \* \* \*